United States Patent
Eckert et al.

(10) Patent No.: US 10,181,732 B2
(45) Date of Patent: Jan. 15, 2019

(54) CIRCUIT FOR BALANCING CAPACITOR VOLTAGES AT CAPACITORS IN A DC CIRCUIT

(71) Applicant: SIEMENS AKTIENGESELLSCHAFT, München (DE)

(72) Inventors: Melanie Eckert, Nürnberg (DE); Markus Frühauf, Uttenreuth (DE); Peter Jänicke, Fürth (DE)

(73) Assignee: Siemens Aktiengesellschaft, München (DE)

( * ) Notice: Subject to any disclaimer, the term of this patent is extended or adjusted under 35 U.S.C. 154(b) by 140 days.

(21) Appl. No.: 15/280,431

(22) Filed: Sep. 29, 2016

(65) Prior Publication Data

US 2017/0093185 A1 Mar. 30, 2017

(30) Foreign Application Priority Data

Sep. 30, 2015 (EP) ..................................... 15187517

(51) Int. Cl.
| | | |
|---|---|---|
| *H02J 7/00* | (2006.01) | |
| *H02J 7/34* | (2006.01) | |
| *H02M 1/32* | (2007.01) | |

(52) U.S. Cl.
CPC ............ *H02J 7/0016* (2013.01); *H02J 7/345* (2013.01); *H02M 1/32* (2013.01); *H02M 2001/322* (2013.01)

(58) Field of Classification Search
USPC .................................................. 320/118, 128
See application file for complete search history.

(56) References Cited

U.S. PATENT DOCUMENTS 4,685,039 A * 8/1987 Inou .................. H02M 3/33569
323/289
5,682,022 A 10/1997 Schroder-Brumloop et al.
(Continued)

FOREIGN PATENT DOCUMENTS

| CN | 202261004 U | 5/2012 |
|----|----|----|
| EP | 1315276 A2 | 5/2003 |

(Continued)

OTHER PUBLICATIONS

Vogelsberger Markus A. et al.: "Life-Cycle Monitoring and Voltage-Managing Unit for DC-Link Electrolytic Capacitors in PWM Converters"; IEEE Transactions on Power Electmnios, Institute of Electrical and Electronics Engineers; USA: Bd 26: Nr. 2; pp. 493-503; XP011334719: ISSN; 0885-8993; DOI;10.1109/TPEL. 2010.205971; 2011; (2015Q23847).

*Primary Examiner* — Brian Ngo
(74) *Attorney, Agent, or Firm* — Henry M. Feiereisen LLC

(57) ABSTRACT

A circuit for balancing capacitor voltages at capacitors in a DC circuit includes a first circuit path having first and second capacitors connected in series between first and second potentials of a DC voltage of the DC circuit, with a first center tap arranged between the first and second capacitors. A second circuit path includes first and second switchable semiconductors and first and second balancing elements which are connected in series between the first and second potentials. The first switchable semiconductor is arranged at the first potential, the second switchable semiconductor at the second potential, and the first and second balancing elements are arranged between the first and second switchable semiconductors, with a second center tap arranged between the balancing elements. A first electrical connection (Continued)

is established between the first center tap in the first circuit path and the second center tap in the second circuit path.

13 Claims, 6 Drawing Sheets

(56) References Cited

U.S. PATENT DOCUMENTS

| | | | | |
|---|---|---|---|---|
| 6,859,021 B2* | 2/2005 | Link | ............... | H02M 3/158 323/284 |
| 7,035,070 B2* | 4/2006 | Shiner | ............... | H02J 7/0031 361/91.1 |
| 8,183,870 B1* | 5/2012 | Davies | ............... | H01M 10/4207 320/118 |
| 8,294,428 B2* | 10/2012 | Kakiuchi | ............... | H02J 7/0016 307/110 |
| 8,390,147 B2* | 3/2013 | Stauth | ............... | H02J 3/385 307/77 |
| 8,611,109 B2* | 12/2013 | Roessler | ............... | H02M 3/33576 363/21.14 |
| 8,829,854 B2* | 9/2014 | Park | ............... | H01M 10/4264 320/118 |
| 8,970,063 B2* | 3/2015 | Leppanen | ............... | H02J 7/0016 307/18 |
| 9,071,056 B2* | 6/2015 | Yang | ............... | H02J 7/0016 |
| 9,568,555 B2* | 2/2017 | Nortman | ............... | H02J 7/0016 |
| 2013/0182783 A1 | 7/2013 | Jänicke | | |

FOREIGN PATENT DOCUMENTS

| | | |
|---|---|---|
| EP | 2541748 A1 | 1/2013 |
| EP | 2584686 A1 | 4/2013 |
| EP | 2709259 A2 | 5/2014 |
| JP | H10295081 A | 11/1998 |
| JP | 2003088144 A | 3/2003 |
| JP | 2008301623 A | 12/2008 |

* cited by examiner

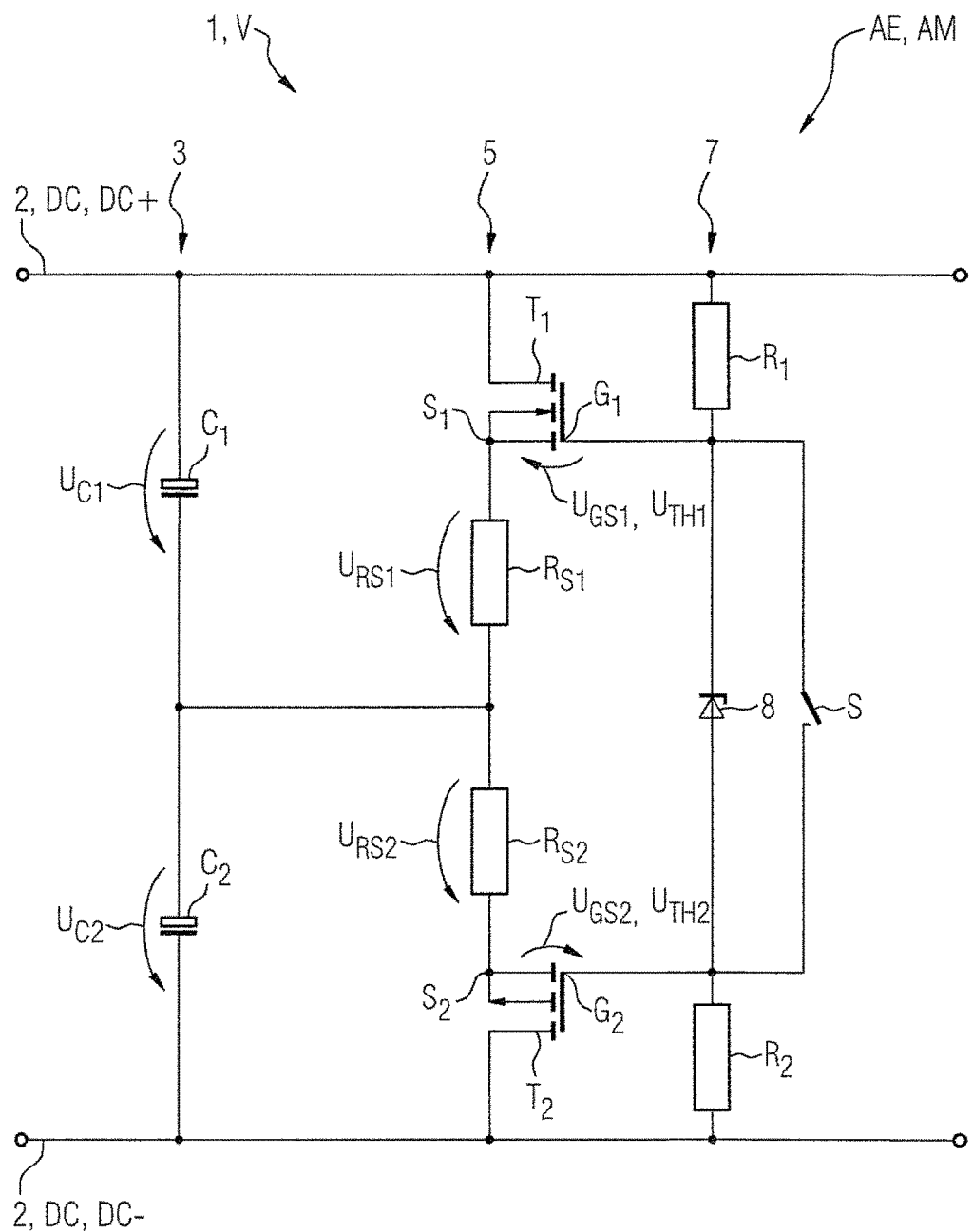

CIRCUIT FOR BALANCING CAPACITOR VOLTAGES AT CAPACITORS IN A DC CIRCUIT

CROSS-REFERENCES TO RELATED APPLICATIONS

This application claims the priority of European Patent Application, No. 15187517.6, filed Sep. 30, 2015, pursuant to 35 U.S.C. 119(a)-(d), the disclosure of which is incorporated herein by reference in its entirety as if fully set forth herein.

BACKGROUND OF THE INVENTION

The invention relates to a circuit for balancing capacitor voltages at capacitors in a DC circuit.

The following discussion of related art is provided to assist the reader in understanding the advantages of the invention, and is not to be construed as an admission that this related art is prior art to this invention.

Electrical assemblies often have different voltages and voltage levels for the energy supply and the energy distribution to their electrical components. For example, for electric converters with a DC circuit or with a DC link it is often inherently necessary, via a temporary storage of electrical energy, reliably to provide or decrease the DC voltage depending on the operating mode and operating point in the DC circuit.

Capacitors are particularly suitable as intermediate energy stores for the often dynamic intermediate storage and discharging processes at the DC circuit, due to their known electric properties. Many uses of electrical converters require high DC voltages in the DC circuit, which can be up to 800V and more. Since the working voltages of the capacitors which are suitable and, from an economic standpoint, available are limited, often two or more capacitors must necessarily be connected in series in the DC circuit so that they can be operated with the DC voltage of the DC circuit. Capacitors have, in particular, the undesirable property for normal operation in the DC circuit, due to structural and material-related configurations and tolerances, of discharging themselves over a, mostly individual, time period. In this process, a "leakage current", also known as a residual current, flows via a leakage resistance of the capacitor, where the charge on the capacitor and thus also the voltage across the capacitor decreases.

In this context, normal operation should be understood as an operating state of the electrical assembly, that is, particularly also of the electrical converter, where no switching off of the energy distribution or the energy supply for the DC circuit initiated by the user or the usage process is activated.

Since the leakage currents of the capacitors differ in general due to the aforementioned tolerances and therefore an unacceptably high capacitor voltage can arise at the capacitors connected in series in the DC circuit which have a lower or no leakage current, damage to or destruction of the capacitors is to be prevented.

A known approach to balancing the capacitors in a DC circuit involves the introduction of at least two electric resistors in a further series connection in the DC circuit, which is arranged parallel to the series connection of the capacitors. In each of these series connections, a center tap is arranged between two capacitors and two resistors, respectively electrically connected to one another. This simple form of balancing circuit now assumes the balancing of the capacitor voltages in normal operation. It is also suitable, however, following switching off of the electrical converter and thus interrupting the energy supply for the DC circuit, for discharging the capacitors as rapidly and reliably as possible. A decisive disadvantage of this solution is the fact that in the electrical resistors of the further series connection in the DC circuit, cross currents flow continually during normal operation, even if balancing of the capacitor voltages is not necessary. Thus, significant electrical losses are sometimes generated, which lessen the overall efficiency of the electrical converter.

EP 2 584 686 A1 discloses a circuit and a method for balancing capacitors connected in series in a DC circuit with a center tap between the capacitors, which is intended in particular to prevent the electrical losses of the balancing circuit described in the introduction. A further series connection is provided in the DC circuit and includes of two switch elements, which is connected in parallel to the series connection of capacitors and the center tap at the capacitors and a further center tap between the first and second switch element are connected via an inductor. On a voltage increase at the first or the second capacitor, a pulse frequency can be applied to the first and/or the second switch element and the first or the second capacitor is partially dischargeable during a respective pulse duration via the inductor and the respective switch element. Simply stated, via the inductor and the switch elements, the excess energy is "pushed back and forth" between the capacitors. A regulating unit herein determines the voltage via the capacitors. Depending on the voltage difference, the corresponding switch element is controlled via pulse width modulation (PWM) and the excess energy is displaced via the inductor.

This type of balancing, however, functions only for a capacitor bank with at least two series connections of capacitors in the DC circuit. This solution is also designed technically complex since for the PWM, at least one regulating unit with a processor is provided and the balancing circuit cannot be configured for the PWM without the processor.

FIG. 1 shows a schematic circuit diagram of a conventional balancing circuit for balancing capacitor voltages at capacitors $C_1$, $C_2$ in the DC circuit 2. The two capacitors $C_1$, $C_2$ are connected in series and arranged between a first potential DC+ and a second potential DC− of a DC voltage DC in the DC circuit 2. So that the capacitor voltages at the capacitors $C_1$, $C_2$ can fall off symmetrically, two balancing elements $R_{S1}$, $R_{S2}$ in the form of series-connected ohmic resistors are connected in parallel to the series-connected capacitors $C_1$, $C_2$. In each case, center taps 4, 6 introduced between the capacitors $C_1$, $C_2$ and the balancing elements $R_{S1}$, $R_{S2}$ are connected to one another via an electrical connection 9. Without this balancing of the capacitor voltages at the, with regard to type and electrical values, similarly selected capacitors $C_1$, $C_2$, due to material and design-related tolerances, an uneven voltage distribution would arise at the capacitors $C_1$, $C_2$. If, for example, a first capacitor $C_1$ has a smaller leakage current than a second capacitor $C_2$, the first capacitor $C_1$ has a higher capacitor voltage applied to it which can lead, possibly, to the destruction or at least the damaging of the first capacitor $C_1$. Typically, the values of the ohmic resistors introduced as balancing elements $R_{S1}$, $R_{S2}$ are equal and are selected such that they are able to conduct cross currents which amount to a multiple of the possible leakage currents of the capacitors $C_1$, $C_2$.

Such balancing circuits are often used in electric converters, in particular frequency converters with a DC circuit 2 or a DC link circuit where due to the size of the DC voltage in the DC circuit 2, a plurality of capacitors $C_1$, $C_2$ are connected in series. Typically, however, the maximum breakdown resistance of the capacitors $C_1$, $C_2$ configured, for example, as electrolytic capacitors and connected in series is insufficient for the DC voltage in the DC circuit 2, for which reason the capacitors $C_1$, $C_2$ are operated as described in series in the DC circuit 2. The balancing elements $R_{S1}$, $R_{S2}$ and their arrangement in the balancing circuit shown in FIG. 1 prevent an inadmissibly high voltage drop at the capacitors $C_1$, $C_2$, which can arise due to leakage currents, although significant power losses are to be accepted since the cross currents through the balancing elements $R_{S1}$, $R_{S2}$ also flow, when no balancing of the capacitor voltages is necessary It would be desirable and advantageous to provide an improved circuit for balancing capacitor voltages at capacitors in a DC circuit to obviate prior art shortcomings and to enable the circuit to be self-controlling, while generating a low power loss and yet being efficiently both technically and economically.

SUMMARY OF THE INVENTION

According to one aspect of the present invention, a circuit for balancing capacitor voltages at capacitors in a DC circuit includes a first circuit path including a first capacitor and a second capacitor connected in series between a first potential and a second potential of a DC voltage of the DC circuit, with a first center tap being arranged between the first and second capacitors, a second circuit path including first and second switchable semiconductors, and first and second balancing elements, the first and second switchable semiconductors, and first and second balancing elements being connected in series between the first and second potentials, with the first switchable semiconductor arranged at the first potential, the second switchable semiconductor arranged at the second potential, and the first and second balancing elements arranged between the first and second switchable semiconductors, with a second center tap arranged between the first and second balancing elements, and a first electrical connection established between the first center tap in the first circuit path and the second center tap in the second circuit path.

The invention is advantageously based on the recognition that for capacitors of a series connection in the DC circuit, leakage currents arise to differing degrees, leading to an uneven distribution of capacitor voltages across the individual capacitors with respect to the DC voltage applied in the DC circuit. Herein, the capacitor which has the respective larger leakage current is to be charged as required until a balancing of the capacitor voltages is approximately created without unnecessary electrical losses arising or a technically complex solution being required therefor.

A circuit in accordance with the present invention, particularly advantageously enables a charging of the capacitor of the first circuit path according to need, which has the respective lowest capacitor voltage of the capacitors. Via the balancing resistors and the switchable semiconductor, a current necessary for the charging of the corresponding capacitor, according to the need, can be generated.

The respective switchable semiconductor which is not necessary for the charging of the capacitor, according to the need, with the lowest capacitor voltage is or remains electrically open. When balancing is not needed due to approximately the same capacitor voltages, both switchable semiconductors are controllable so that they are or remain electrically open. Thus, lasting and unnecessary electrical losses in the circuit for balancing the capacitor voltages are prevented.

The number of the capacitors in the first circuit path has no influence on a functional capability and efficiency of the circuit for balancing the capacitor voltages, provided at least two capacitors are arranged in series in the first circuit path.

According to another advantageous feature of the present invention, the first switchable semiconductor can have a first gate terminal, and the second switchable semiconductor can have a further gate terminal, with the first and second gate terminals being each controllable in dependence on a first leakage current at the first capacitor or a second leakage current at the second capacitor, such that a first capacitor charging current is impressable into the second capacitor for compensation of the second leakage current via the first switchable semiconductor and the first balancing element, and a second capacitor charging current is impressable into the first capacitor for compensation of the first leakage current via the second switchable semiconductor and the second balancing element.

The capacitor with the respective largest leakage current has the lowest capacitor voltage as compared with the remaining capacitor or the remaining capacitors in the first circuit path. The circuit is configured so that the capacitor with the respective lowest capacitor voltage is charged via the respective capacitor charging current for long enough until the capacitor voltages are distributed approximately symmetrically among one another relative to the DC voltage at the DC circuit.

An internal resistance can be influenced by switchable semiconductors at their circuit path so that they operate in a linear region. The switchable semiconductor which is to carry the respective capacitor charging current for charging as needed for the capacitor with the lowest capacitor voltage can thus assume an operating point where its contact gap does not fully open or close. This influences the size of the capacitor charging current which is required for charging as needed of the respective capacitor.

The balancing elements are also used for current feedback. When the switchable semiconductors are opened further in the linear region, the capacitor charging current which flows through the respective switchable semiconductor rises. Thus, the voltage decreases more and more across the respective balancing element. Via this, a gate-source voltage across the respective gate terminal and a respective source terminal of the switchable semiconductors also decreases, which also reduces the capacitor charging current concerned.

According to another advantageous feature of the present invention, the circuit can include a third circuit path including a first voltage divider element, a voltage stabilization element, and a second voltage divider element, which are connected in series between the first and second potentials, with the first voltage divider element being arranged at the first potential, the second voltage divider element being arranged at the second potential, and the voltage stabilization element being arranged between the first and second voltage divider elements, a first terminal arranged between the first voltage divider element and the voltage stabilization element, and a second terminal arranged between the second voltage divider element and the voltage stabilization element, a second electrical connection established between the first gate terminal of the first switchable semiconductor and the first terminal, a third electrical connection established between the further gate terminal of the second switchable semiconductor and the second terminal, a fourth electrical connection established between the first and second terminals in parallel relation to the voltage stabilization element, and a switch element arranged in the fourth electrical connection.

This advantageous embodiment of the circuit reveals a self-controlling configuration of the circuit so that a processor-supported control of the switchable semiconductor can be dispensed with.

Furthermore, the circuit is also advantageously usable for an active symmetrical discharging of the capacitors in the DC circuit.

According to another advantageous feature of the present invention, the switch element can be embodied by an electronic switch. Electronic switches have the advantage that mechanical switching movements do not take place. For electric circuits, they are preferable to mechanical switches both in respect of their design properties such as structural size and stability and also in respect of their functional properties such as switching speed and decoupling ability.

According to another advantageous feature of the present invention, the electronic switch can be embodied by an optocoupler. An optocoupler has the advantage of a particularly stringent decoupling both from an electrical and a mechanical standpoint. It is favored for use in intrinsically secure circuits since its circuit state can be selected such that, in the zero current state of the circuit, a safe circuit state is almost unavoidable, for example, for an open state of the optocoupler.

According to another advantageous feature of the present invention, the balancing of the capacitor voltages at the first and second capacitors of the DC circuit can be executed in a normal operation, when the switch element is closed, or an active symmetrical discharging of the first and second capacitors for a switch-off mode of the DC circuit can be executed, when the switch element is open.

Apart from the balancing for normal operation, the circuit can also be used for active symmetrical discharging of the capacitors, which is realizable with the switch element in a technically simple manner. The circuit can herein also be configured so that the balancing of the capacitor voltages at the capacitors of the DC circuit in normal operation is executable via the opened switch element and the active symmetrical discharging of the capacitors is executable for a switch-off mode of the DC circuit via the closed switch element.

According to another advantageous feature of the present invention, the voltage divider elements in the third circuit path can be high-valued resistors. In order to keep the losses of the voltage divider elements at the gate terminals as small as possible, their values are advantageously selected to be high-resistance. Resistance values from 10 kΩ are considered to be high-resistance.

According to another advantageous feature of the present invention, the voltage stabilization element in the third circuit path can be a Zener diode. The Zener diode can be operated in the non-conducting direction permanently in the operating range of its breakdown voltage. In contrast to a normal diode, this permanently existing operating range does not result in the destruction of the Zener diode. Thus, the Zener diode can ensure a voltage needed at both the gate terminals of the switchable semiconductor, which makes the switchable semiconductor operable in a linear region for the active symmetrical discharging in the switch-off mode of the circuit.

According to another advantageous feature of the present invention, the capacitors in the first circuit path can be embodied by electrolytic capacitors. Electrolytic capacitors have the advantage over representatives of other capacitor families that they can have a high capacitance. This makes them interesting for uses in the DC circuit of, for example, electrical converters from both technical and economic standpoints. A further property is a reduction in capacitance with increasing frequency, whereas however their current-carrying capacity increases. Electrolytic capacitors can be loaded with a relatively high current intensity (ripple current) and usually have a long lifespan.

According to another advantageous feature of the present invention, the balancing elements in the second circuit path can be embodied by low-valued resistors. When the capacitor charging current to compensate for the leakage current of the capacitors flows respectively through the switchable semiconductors and the balancing elements, via the inserted low-valued resistors, it is advantageous that due to the balancing elements, less electrical losses arise whereas in contrast thereto, electrical losses tend to arise in the switchable semiconductors.

According to another advantageous feature of the present invention, the switchable semiconductors in the second circuit path can be embodied by MOSFETs. The use of MOSFETs (metal oxide semiconductor field effect transistor) is particularly advantageous since MOSFETs can be operated in a linear region which corresponds to the behavior of an ohmic resistor.

Where referring to switchable semiconductors that close or are closed, this also includes the linear region in which the switchable semiconductor, in particular the MOSFET, can operate with corresponding control.

With this behavior of the MOSFETs, the capacitor charging current is controllable or applicable for charging the respective capacitors. But also during the active symmetrical discharging in the switch-off mode, via the control of the MOSFETs in linear operation, a time constant for the discharging of the capacitors can be influenced and the discharging is therefore also controllable.

According to another aspect of the present invention, a method for balancing an active symmetrical discharging for a DC circuit includes making via a switch element an operating mode selection in the circuit, selecting a balancing of capacitor voltages at capacitors of the DC circuit for a normal operation, when the switch element is electrically closed, and selecting the active symmetrical discharging of the capacitors of the DC circuit for a switch-off mode, when the switch element is electrically open.

The operating mode selection via the switch element selects, depending on the electrical state of the switch element, firstly for normal operation, the balancing of the capacitor voltage, secondly the active symmetrical discharging of the capacitors for the switch-off mode in the DC circuit.

The method is configurable such that the switch element receives a higher-order switching instruction at the start of the activated normal operation, which electrically closes the switch element. A further higher-order switching instruction can cause the switch element to open electrically if the switch-off mode is activated for the DC circuit.

According to another advantageous feature of the present invention, for normal operation with the switch element being closed, when the first capacitor voltage of the first capacitor is greater than the second capacitor voltage of the second capacitor, via a first voltage divider element, a first gate terminal can be controlled, such that a first switchable semiconductor closes, then via a second voltage divider element, a further gate terminal can be controlled, such that a second switchable semiconductor opens and a first capacitor charging current flows through the first balancing element for compensation of a second leakage current at the second capacitor until a first gate-source voltage at the first switchable semiconductor reaches or drops below a first threshold voltage and the first switchable semiconductor opens.

According to another advantageous feature of the present invention, for normal operation with the switch element being closed, when the first capacitor voltage of the first capacitor is smaller than the second capacitor voltage of the second capacitor, via a second voltage divider element, a further gate terminal can be controlled such that a second switchable semiconductor closes, via a first voltage divider element, a first gate terminal can be controlled such that a first switchable semiconductor opens and a second capacitor charging current flows through a second balancing element for compensation of a first leakage current at the first capacitor until a further gate-source voltage at the second switchable semiconductor reaches or undershoots a further threshold voltage and the second switchable semiconductor opens.

The method therefore shows clearly and in an advantageous manner that control of the switchable semiconductor via a regulating unit and a modulation method is not necessary at any time point for the balancing of the capacitor voltages at the capacitors of the first circuit path in the DC circuit. It is also comprehensible that the electrical losses on carrying out the method differ significantly from known balancing methods. Thus the capacitor charging current only flows through the switchable semiconductor and the balancing element, and thus creates at least limited losses, which is required for the necessary charging of the capacitor. If no balancing is necessary since the capacitor voltages are approximately equal in relation to the DC voltage in the DC circuit, no electrical losses are incurred since the switchable semiconductors are opened.

According to another advantageous feature of the present invention, for the switch-off mode with the switch element being open, via a voltage stabilization element, a first voltage stabilization element and a second voltage divider element, a first gate terminal of a first switchable semiconductor and a further gate terminal of a second switchable semiconductor can be controlled such that both switchable semiconductors are closed, and when the capacitors are symmetrically discharged via the second circuit path until a first gate-source voltage at the first switchable semiconductor reaches or drops below a first threshold voltage and/or a further gate-source voltage at the second switchable semiconductor reaches or drops below a further threshold voltage, and the switchable semiconductors are opened.

This also reveals a further advantage of the method for the switching. Firstly, following opening of the switch, the active symmetrical discharging for the switch-off mode is possible, secondly, active discharging via simultaneous balancing of the capacitor voltages, where the linear operation of the switchable semiconductors can be utilized to influence a discharge time via the control of the gate terminals.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 shows a fifth schematic circuit diagram of a circuit according to the invention of FIGS. 2 to 5, showing the method according to the invention in switch-off mode for active symmetrical discharging of capacitors in the DC circuit.

DETAILED DESCRIPTION OF PREFERRED EMBODIMENTS

Figure 1:
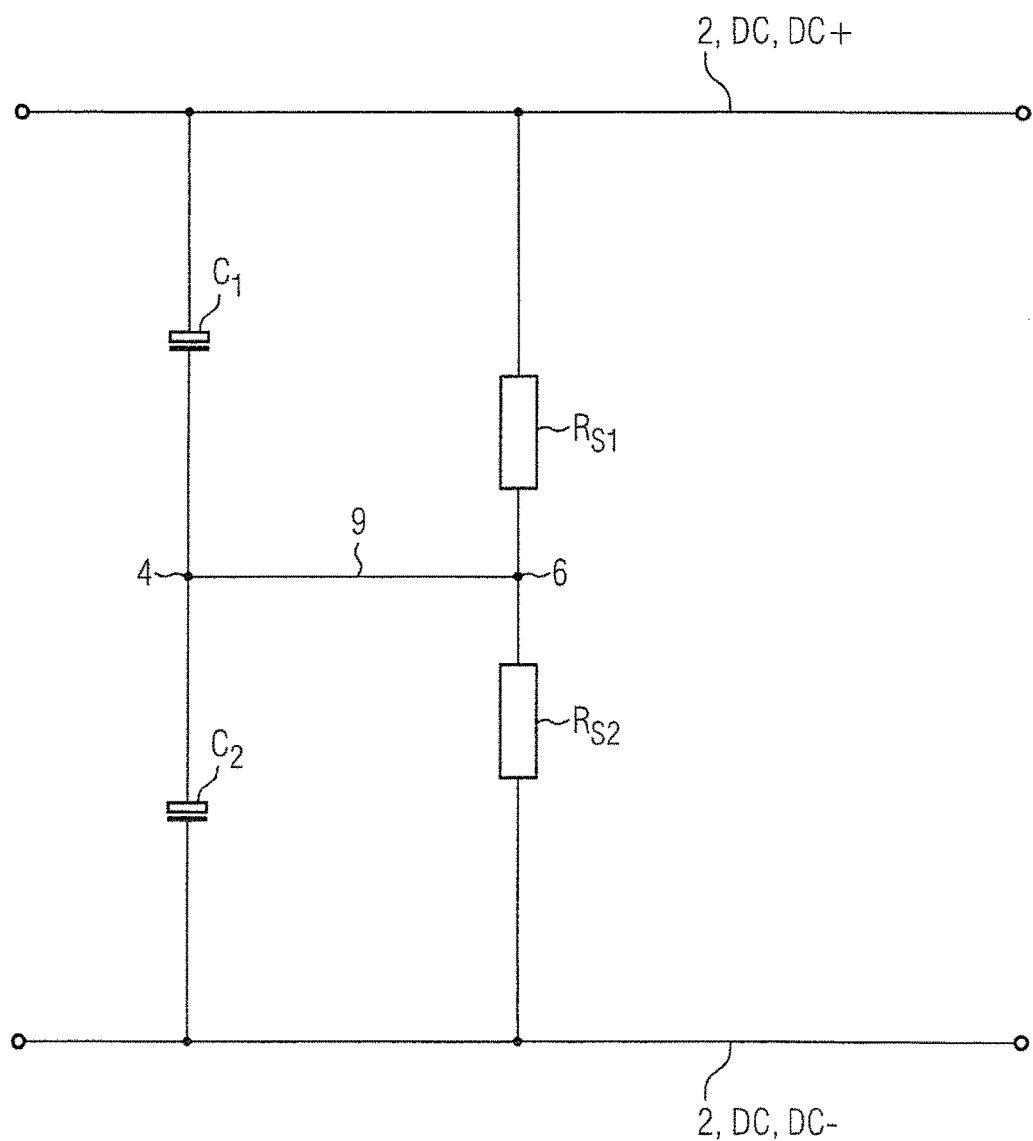
FIG. 1 shows a schematic circuit diagram of a prior art balancing circuit for balancing capacitor voltages at capacitors in the DC circuit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
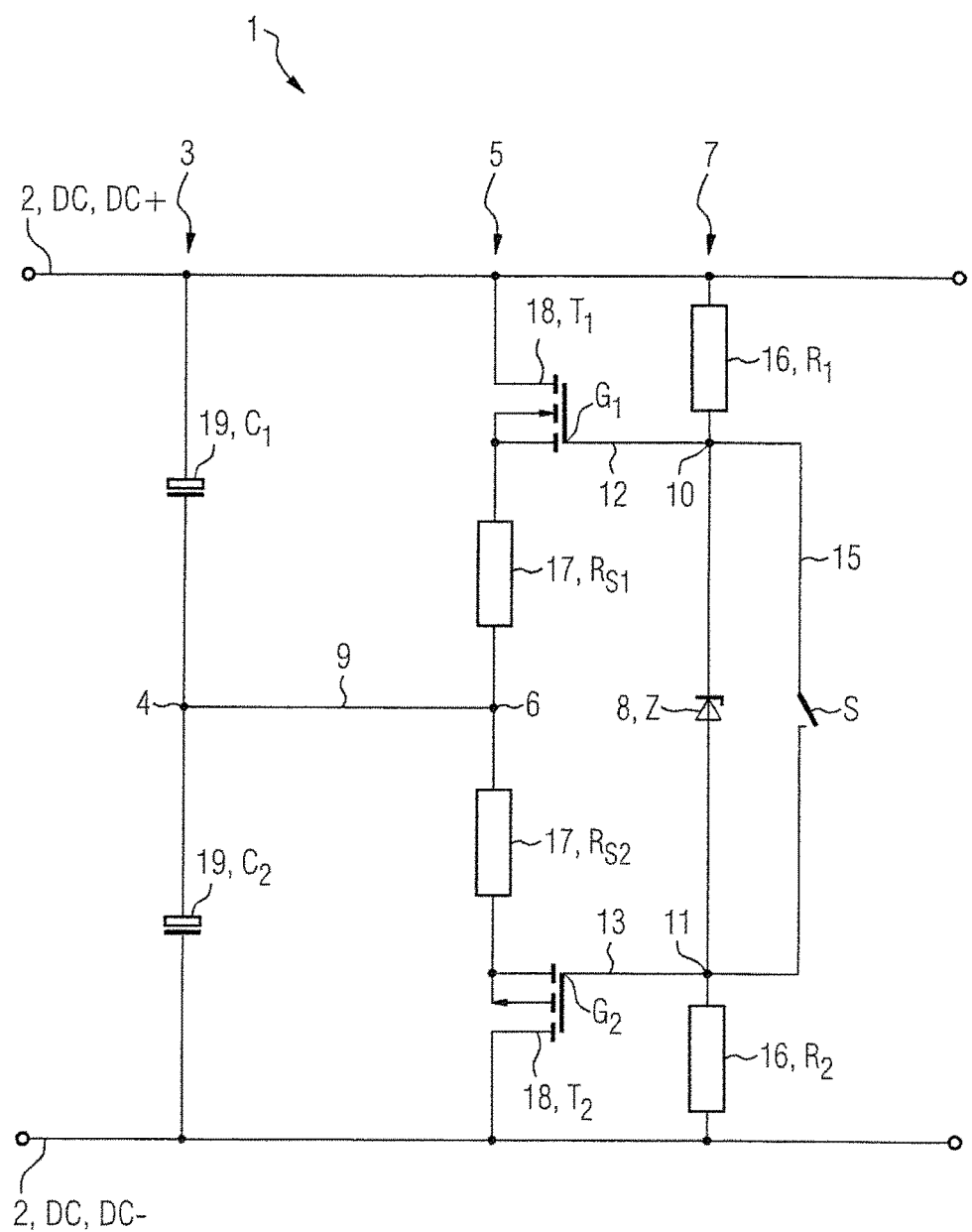
FIG. 2 shows a first schematic circuit diagram showing a circuit according to the invention for balancing capacitor voltages at capacitors in the DC circuit and for active symmetrical discharging of capacitors in the DC circuit.

Turning now to the drawing, and in particular to FIG. 2, there is shown a first schematic circuit diagram of the circuit 1 according to the invention for balancing capacitor voltages $U_{C1}$, $U_{C2}$ at capacitors $C_1$, $C_2$ in the DC circuit 2 and for active symmetrical discharging of capacitors $C_1$, $C_2$ in the DC circuit 2. In accordance with the present invention, a first circuit path 3 is provided in which at least one first capacitor $C_1$ and one second capacitor $C_2$ are connected in series and arranged between a first potential DC+ and a second potential DC− of a DC voltage DC of the DC circuit 2. Arranged between the first capacitor $C_1$ and the second capacitor $C_2$ is a first center tap 4.

A second circuit path 5 has a first switchable semiconductor $T_1$, a first balancing element $R_{S1}$, a second balancing element $R_{S2}$ and a second switchable semiconductor $T_2$ which are also connected in series between the potentials $DC_+$, DC−. In this second circuit path 5, the first switchable semiconductor $T_1$ is arranged at the first potential DC+ and the second switchable semiconductor $T_2$ is arranged at the second potential DC−. The first balancing element $R_{S1}$ and the second balancing element $R_{S2}$, however, are introduced between the first switchable semiconductor $T_1$ and the second switchable semiconductor $T_2$. Furthermore, the first balancing element $R_{S1}$ and the second balancing element $R_{S2}$ form a second center tap 6.

A first electric connection 9 of the first center tap 4 in the first circuit path 3 is connected to the second center tap 6 in the second circuit path 5.

FIG. 2 also shows, connected in series between the potentials DC+, DC− of the DC circuit 2, in a third circuit path 7, a first voltage divider element $R_1$, a voltage stabilization element 8 and a second voltage divider element $R_2$. The first voltage divider element $R_1$ is at the first potential DC+, the second voltage divider element $R_2$ is at the second potential DC− and the voltage stabilization element 8 is arranged between the voltage divider elements $R_1$, $R_2$. A first terminal 10 is arranged between the first voltage divider element $R_1$ and the voltage stabilization element 8 and a second terminal 11 is arranged between the second voltage divider element $R_2$ and the voltage stabilization element 8.

Whilst a second electrical connection 12 is arranged between the first gate terminal $G_1$ of the first switchable semiconductor $T_1$ and the first terminal 10, a third electrical connection 13 is arranged between the further gate terminal $G_2$ of the second switchable semiconductor $T_2$ and the second terminal 11.

A switch element S is arranged in a fourth electrical connection 15 between the first terminal 10 and the second terminal 11 parallel to the voltage stabilization element 8.

The circuit 1 shown in FIG. 2 is configured, firstly, to carry out the balancing of the capacitor voltages at the capacitors $C_1$, $C_2$ of the DC circuit 2 in normal operation if the switch element S is closed, secondly however to carry out an active symmetrical discharging of the capacitors $C_1$, $C_2$ for a switch-off mode of the DC circuit if the switch element S is open.

Advantageously, the voltage divider elements $R_1$, $R_2$ in the third circuit path 7 are configured as high-valued resistors 16 and the balancing elements $R_{S1}$, $R_{S2}$ in the second circuit path 5 are configured as low-valued resistors 17.

The voltage stabilization element 8 in the third circuit path 5 has a special significance for the active symmetrical discharging of the capacitors $C_1$, $C_2$ in the switch-off mode of the DC circuit 2. A Zener diode Z proves herein to be a suitable component for voltage stabilization at the gate terminals $G_1$, $G_2$ of the switchable semiconductors $T_1$, $T_2$.

MOSFETs 18 as switchable semiconductors $T_1$, $T_2$ can be operated in a linear region where the MOSFETs 18 behave in this region like an ohmic resistor. This is a property which is advantageous both for the balancing of the capacitor voltages and also for the active symmetrical discharging of the capacitors $C_1$, $C_2$, since thereby both charging and discharging currents can thereby be controlled in the second circuit path 5.

The circuit 1 is particularly suitable for a use of electrolyte capacitors 19 as capacitors $C_1$, $C_2$ in the first circuit path 3 since firstly, in particular, electrolytic capacitors 19 have structurally related leakage currents and, secondly can be operated in a DC circuit 2 at a comparatively high DC voltage DC so that balancing of the capacitor voltages is often unavoidable.

Figure 3:
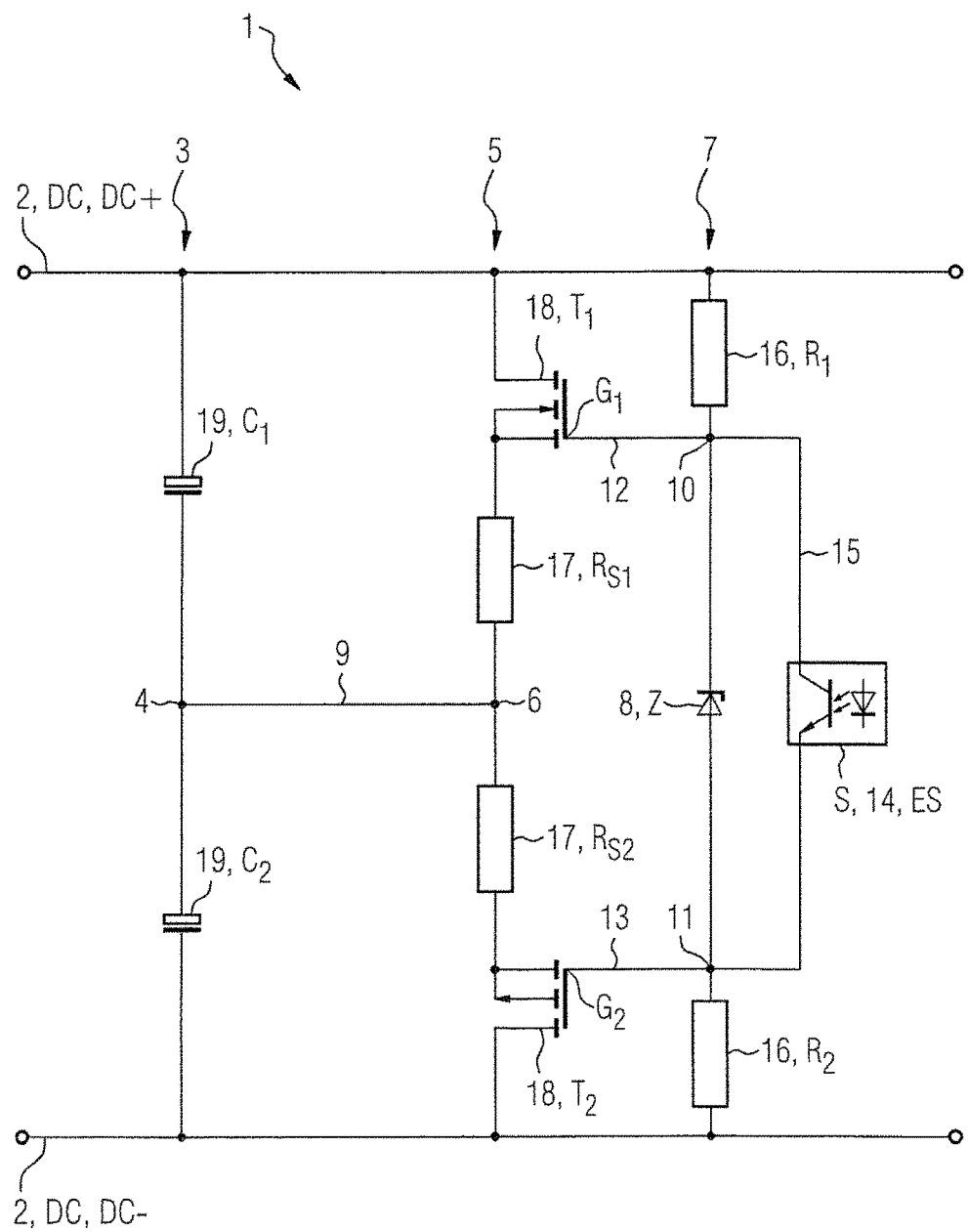
FIG. 3 shows a second schematic circuit diagram of a circuit according to the invention of FIG. 2 with an exemplary embodiment of the switch element.

The schematic circuit diagram of FIG. 3 shows, in principle, the same circuit 1 as FIG. 2. However, the switch element S is configured here in the fourth electrical connection 15 in the form of an electronic switch ES which is identified hereinafter as an optocoupler 14. Electronic switches ES have both structural and functional advantages over mechanical switches. In particular, galvanic separation, such as an optocoupler 14 has as an intrinsic property can ensure that the circuit 1 functions relatively independently in the DC link circuit 2 and, above all, acts in a self-controlling manner.

Figure 4:
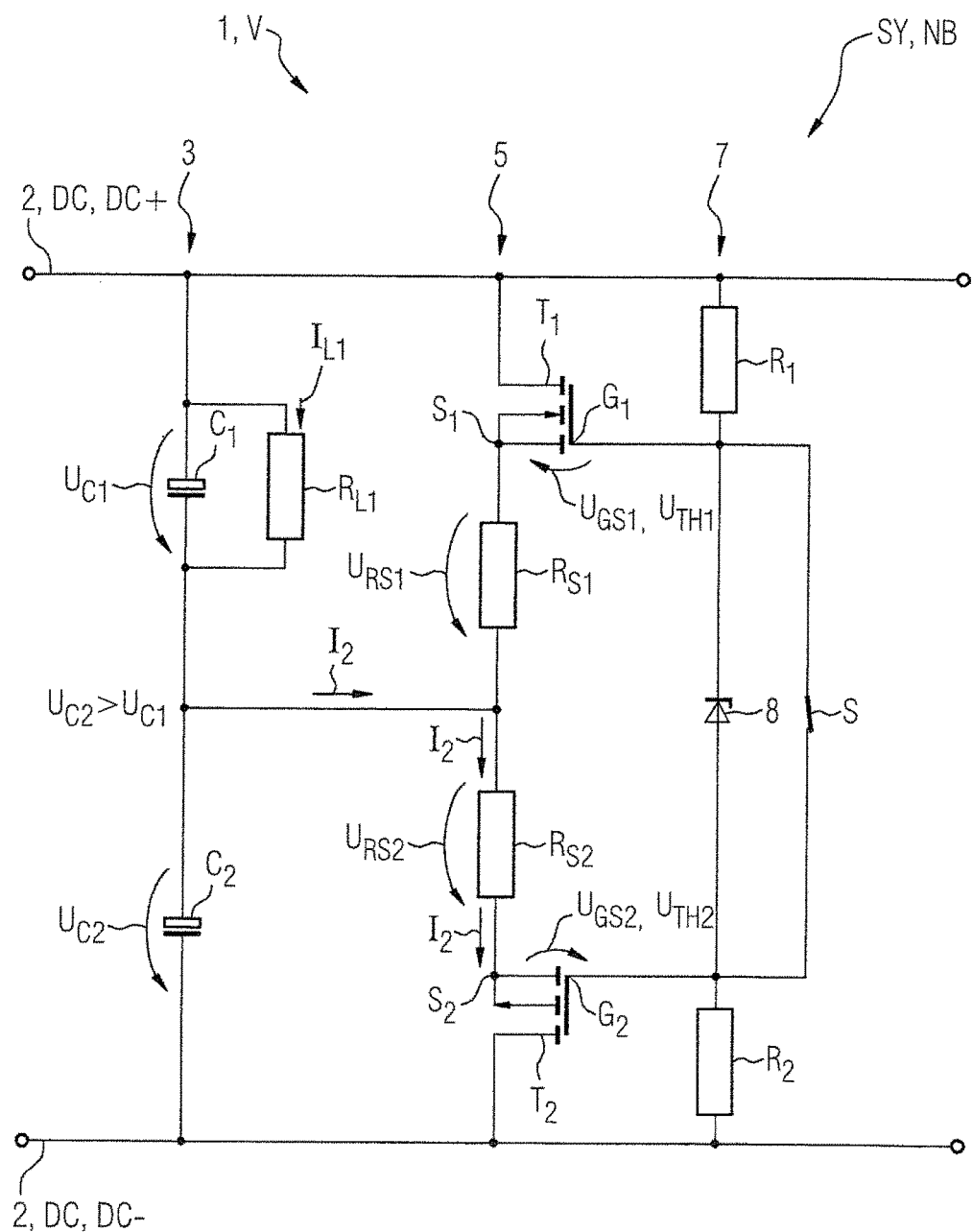
FIG. 4 shows a third schematic circuit diagram of a circuit according to the invention of FIGS. 2 and 3, showing a method according to the invention in normal operation for balancing capacitor voltages at the capacitors in the DC circuit with a first leakage current of a first capacitor.

FIG. 4 illustrates, in a third schematic circuit diagram of the circuit 1 according to the invention of FIG. 2 and FIG. 3, a method V according to the invention for a normal operation NB for balancing SY capacitor voltages $U_{C1}$, $U_{C2}$ at the capacitors $C_1$, $C_2$ in the DC circuit 2 with a first leakage current $I_{L1}$ of a first capacitor $C_1$.

Via a switch element S, an operating mode selection A has been made in the circuit 1. The balancing SY of the capacitor voltages $U_{C1}$, $U_{C2}$ at the capacitors $C_1$, $C_2$ of the DC circuit 2 for normal operation NB is selected since the switch element S is electrically closed.

The first capacitor voltage $U_{C1}$ of the first capacitor $C_1$ is smaller, due to a first leakage current $I_{L1}$ through the first leakage resistance $R_{L1}$ than the second capacitor voltage $U_{C2}$ of the second capacitor $C_2$.

Via a first voltage divider element $R_1$, a first gate terminal $G_1$ is controlled such that a first switchable semiconductor $T_1$ opens and via a second voltage divider element $R_2$, a further gate terminal $G_2$ is controlled such that a second switchable semiconductor $T_2$ closes. The first switchable semiconductor $T_1$ remains open since a first gate-source voltage $U_{GS1}$ is smaller than a first threshold voltage $U_{TH1}$ across the first source terminal $S_1$ and the first gate terminal $G_1$ of the first switchable semiconductor $T_1$.

The second capacitor charging current $I_2$ which becomes established flows through a second balancing element $R_{S2}$ for compensation of the first leakage current $I_{L1}$ at the first capacitor $C_1$ until a further gate-source voltage $U_{GS2}$ across a further source terminal $S_2$ and the further gate terminal $G_2$ at the second switchable semiconductor $T_2$ reaches or undershoots a further threshold voltage $U_{TH2}$, and thus opens the second switchable semiconductor $T_2$.

Figure 5:
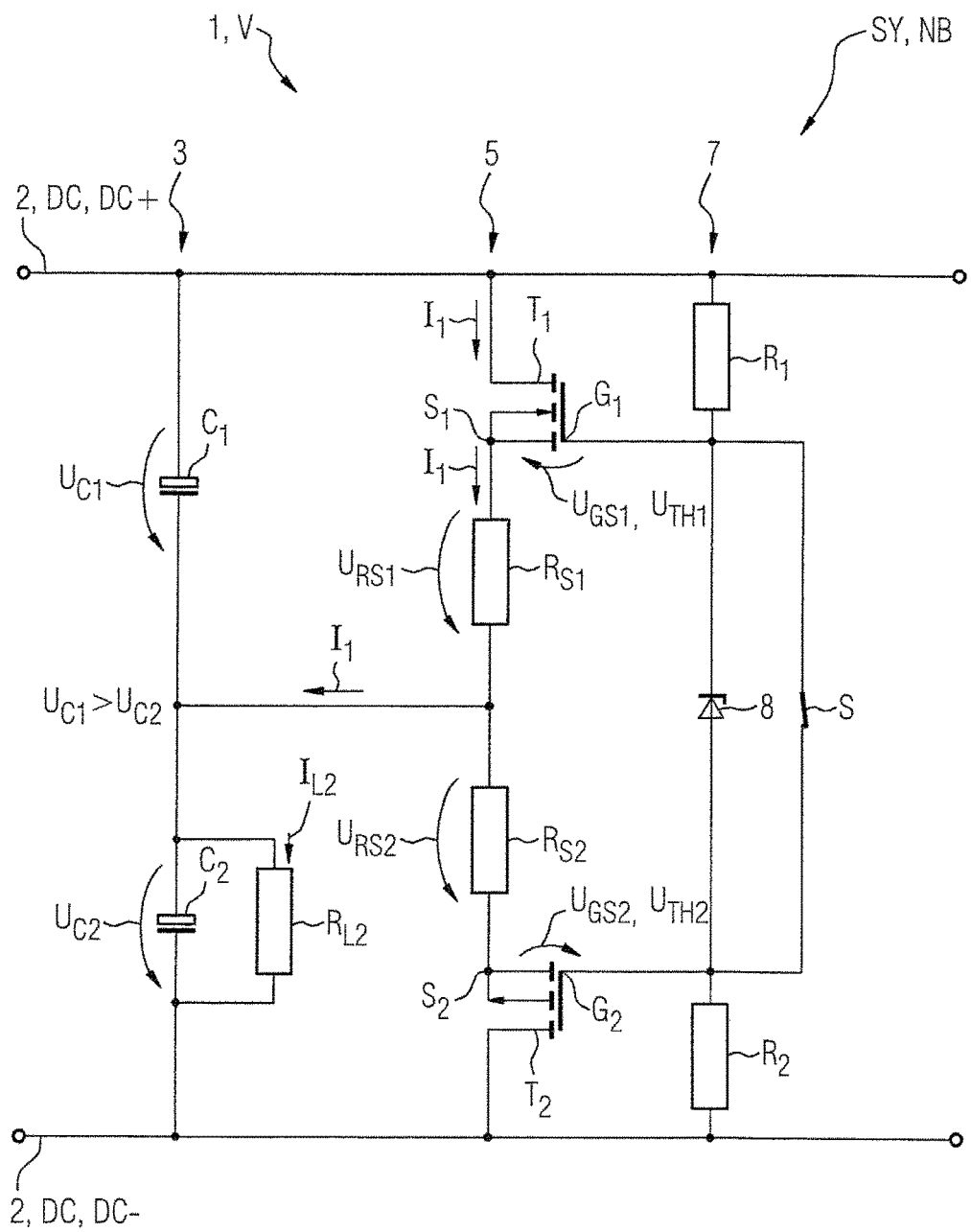
FIG. 5 shows a fourth schematic circuit diagram of a circuit according to the invention of FIGS. 2 to 4, showing the method according to the invention in normal operation for balancing capacitor voltages at the capacitors in the DC circuit with a second leakage current of a second capacitor.

FIG. 5 illustrates, in a fourth schematic circuit diagram of the circuit 1 according to the invention of FIGS. 2 to 4, a method V according to the invention for a normal operation NB for balancing SY capacitor voltages $U_{C1}$, $U_{C2}$ at the capacitors $C_1$, $C_2$ in the DC circuit 2 with a second leakage current $I_{L2}$ of a second capacitor $C_2$.

Via a switch element S, an operating mode selection A has been made in the circuit 1. The balancing SY of the capacitor voltages $U_{C1}$, $U_{C2}$ at the capacitors $C_1$, $C_2$ of the DC circuit 2 for normal operation NB is selected since the switch element S is electrically closed.

The second capacitor voltage $U_{C2}$ of the second capacitor $C_2$ is smaller, due to a second leakage current $I_{L2}$ through the second leakage resistance $R_{L2}$, than the first capacitor voltage $U_{C1}$ of the first capacitor $C_1$.

Via a second voltage divider element $R_2$, a further gate terminal $G_2$ is controlled such that a second switchable semiconductor $T_2$ opens and via a first voltage divider element $R_1$, a first gate terminal $G_1$ is controlled such that a first switchable semiconductor $T_1$ closes. The second switchable semiconductor $T_2$ remains open since a further gate-source voltage $U_{GS2}$ is smaller than a further threshold voltage $U_{TH2}$ across the further source terminal $S_2$ and the further gate terminal $G_2$ of the second switchable semiconductor $T_2$.

The first capacitor charging current $I_1$ which becomes established flows through a first balancing element $R_{S1}$ for compensation of the second leakage current $I_{L2}$ at the second capacitor $C_2$ until a first gate-source voltage $U_{GS1}$ across a first source terminal $S_1$ and the first gate terminal $G_1$ at the first switchable semiconductor $T_1$ reaches or undershoots a first threshold voltage $U_{TH1}$, and thus opens the first switchable semiconductor $T_1$.

FIG. 6 illustrates a fifth schematic circuit diagram of the circuit according to the invention of FIGS. 2 to 5 showing the method V according to the invention in switch-off mode AM for active symmetrical discharging AE of capacitors $C_1$, $C_2$ in the DC circuit 2.

Via a switch element 5, an operating mode selection A has been made in the circuit 1. The active symmetrical discharging AE of the capacitors $C_1$, $C_2$ of the DC circuit 2 for a switch-off mode AM is selected since the switch element S is electrically open.

Via a voltage stabilization element 8, a first voltage divider element $R_2$, and a second voltage divider element $R_2$ of the third circuit path 7, respectively a first gate terminal $G_1$ of a first switchable semiconductor $T_1$ and a further gate terminal $G_2$ of a second switchable semiconductor $T_2$ are controlled such that both switchable semiconductors $T_1$, $T_2$ are closed.

The capacitors $C_1$, $C_2$ are now discharged symmetrically via the second circuit path 5 until a first gate-source voltage $U_{GS1}$ across a first source terminal $S_1$ and the first gate terminal $G_1$ at the first switchable semiconductor $T_1$ reaches or undershoots a first threshold voltage $U_{TH1}$ and/or a further gate-source voltage $U_{GS2}$ across a further source terminal $S_2$ and the further gate terminal $G_2$ at the second switchable semiconductor $T_2$ reaches or undershoots a further threshold voltage $U_{TH2}$, and thus open the switchable semiconductors $T_1$, $T_2$.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A circuit for balancing capacitor voltages at capacitors in a DC circuit, comprising:
   a first circuit path including a first capacitor and a second capacitor connected in series between a first potential and a second potential of a DC voltage of the DC circuit, with a first center tap being arranged between the first and second capacitors;
   a second circuit path including first and second switchable semiconductors, and first and second balancing elements, the first and second switchable semiconductors, and first and second balancing elements being connected in series between the first and second potentials, with the first switchable semiconductor arranged at the first potential, the second switchable semiconductor arranged at the second potential, and the first and second balancing elements arranged between the first and second switchable semiconductors, with a second center tap arranged between the first and second balancing elements; and
   a first electrical connection established between the first center tap in the first circuit path and the second center tap in the second circuit path.

2. The circuit of claim 1, wherein the first switchable semiconductor has a first gate terminal, and the second switchable semiconductor has a further gate terminal, said first and second gate terminals being each controllable in dependence on a first leakage current at the first capacitor or a second leakage current at the second capacitor, such that a first capacitor charging current is impressable into the second capacitor for compensation of the second leakage current via the first switchable semiconductor and the first balancing element, and a second capacitor charging current is impressable into the first capacitor for compensation of the first leakage current via the second switchable semiconductor and the second balancing element.

3. The circuit of claim 1, further comprising:
   a third circuit path including a first voltage divider element, a voltage stabilization element, and a second voltage divider element, which are connected in series between the first and second potentials, with the first voltage divider element being arranged at the first potential, the second voltage divider element being arranged at the second potential, and the voltage stabilization element being arranged between the first and second voltage divider elements;
   a first terminal arranged between the first voltage divider element and the voltage stabilization element, and a second terminal arranged between the second voltage divider element and the voltage stabilization element;
   a second electrical connection established between the first gate terminal of the first switchable semiconductor and the first terminal;
   a third electrical connection established between the further gate terminal of the second switchable semiconductor and the second terminal;
   a fourth electrical connection established between the first and second terminals in parallel relation to the voltage stabilization element; and
   a switch element arranged in the fourth electrical connection.

4. The circuit of claim 3, wherein the switch element is an electronic switch.

5. The circuit of claim 4, wherein the electronic switch is an optocoupler.

6. The circuit of claim 3, wherein the balancing of the capacitor voltages at the first and second capacitors of the DC circuit is executable in a normal operation, when the switch element is closed, or an active symmetrical discharging of the first and second capacitors for a switch-off mode of the DC circuit is executable, when the switch element is open.

7. The circuit of claim 3, wherein the first and second voltage divider elements in the third circuit path are high-valued resistors.

8. The circuit of claim 3, wherein the voltage stabilization element in the third circuit path is a Zener diode.

9. The circuit of claim 1, wherein the first and second capacitors in the first circuit path are electrolytic capacitors.

10. The circuit of claim 1, wherein the first and second balancing elements in the second circuit path are configured as low-valued resistors.

11. The circuit of claim 1, wherein the first and second switchable semiconductors in the second circuit path are MOSFETs.

12. A method for balancing an active symmetrical discharging for a DC circuit, comprising:
   selecting via a switch element one of two operating modes in the circuit, wherein in a first operating mode the switch element is closed and in a second operating mode the switch element is open;
   in the first operating mode
   applying a capacitor voltage to a first capacitor connected in series with a second capacitor, with a capacitor voltage of the first capacitor being greater than a capacitor voltage of the second capacitor;

controlling via a first voltage divider element a first gate terminal of a first switchable semiconductor such that the first switchable semiconductor closes;

controlling via a second voltage divider element a second gate terminal of a second switchable semiconductor such that the second switchable semiconductor opens, and flowing a capacitor charging current through a balancing element for compensating a leakage current at the second capacitor until a gate-source voltage at the first switchable semiconductor reaches or drops below a threshold voltage and the first switchable semiconductor opens; and in the second operating mode controlling the first gate terminal of the first switchable semiconductor and the second gate terminal of the second switchable semiconductor via a voltage stabilization element and via the first and second voltage divider elements such that the first and second switchable semiconductors are closed; and discharging the capacitors symmetrically via a second circuit path until the first gate-source voltage at the first switchable semiconductor reaches or drops below a first threshold voltage and the second gate-source voltage at the second switchable semiconductor reaches or drops below a second threshold voltage and the first and second switchable semiconductors are opened.

13. A method for balancing an active symmetrical discharging for a DC circuit, comprising:

selecting via a switch element one of two operating modes in the circuit, wherein in a first operating mode the switch element is closed and in a second operating mode the switch element is open;

in the first operating mode applying a capacitor voltage to a first capacitor connected in series with a second capacitor, with a capacitor voltage of the first capacitor being smaller than a capacitor voltage of the second capacitor;

controlling via a first voltage divider element a first gate terminal of the first switchable semiconductor such that the first switchable semiconductor opens;

controlling via a second voltage divider element a second gate terminal such that a second switchable semiconductor closes; and flowing a capacitor charging current through a balancing element for compensation of a leakage current at the first capacitor until a gate-source voltage at the second switchable semiconductor reaches or drops below a threshold voltage and the second switchable semiconductor opens; and in the second operating mode controlling the first gate terminal of the first switchable semiconductor and the second gate terminal of the second switchable semiconductor via a voltage stabilization element and via the first and second voltage divider elements such that the first and second switchable semiconductors are closed; and discharging the capacitors symmetrically via a second circuit path until the first pate-source voltage at the first switchable semiconductor reaches or drops below a first threshold voltage and the second gate-source voltage at the second switchable semiconductor reaches or drops below a second threshold voltage and the first and second switchable semiconductors are opened.

* * * * *

UNITED STATES PATENT AND TRADEMARK OFFICE
CERTIFICATE OF CORRECTION

PATENT NO.           : 10,181,732 B2  
APPLICATION NO.      : 15/280431  
DATED                : January 15, 2019  
INVENTOR(S)          : Melanie Eckert, Markus Frühauf and Peter Jänicke It is certified that error appears in the above-identified patent and that said Letters Patent is hereby corrected as shown below:

On the Title Page

On page 2, under FOREIGN PATENT DOCUMENTS:
Correct the publication date of EP 2709259 to read --3/2014--.

In the Claims

In Column 14, Claim 13, Line 26:
Replace "pate-source" with --gate-source--.

Signed and Sealed this
Twenty-first Day of May, 2019

Andrei Iancu
*Director of the United States Patent and Trademark Office*